United States Patent
Zelmanov et al.

(10) Patent No.: US 11,267,374 B2
(45) Date of Patent: Mar. 8, 2022

(54) SHAFTED RECLINERS DUAL DECOUPLING SYSTEM

(71) Applicant: Faurecia Automotive Seating, LLC, Auburn Hills, MI (US)

(72) Inventors: Dmitriy Zelmanov, Auburn Hills, MI (US); Wojciech Smuk, Auburn Hills, MI (US); Boris Biletskiy, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 194 days.

(21) Appl. No.: 16/718,653

(22) Filed: Dec. 18, 2019

(65) Prior Publication Data

US 2021/0188135 A1    Jun. 24, 2021

(51) Int. Cl.
*B60N 2/235* (2006.01)

(52) U.S. Cl.
CPC ........ *B60N 2/2362* (2015.04); *B60N 2205/50* (2013.01)

(58) Field of Classification Search
CPC .. B60N 2205/50; B60N 2/2362; B60N 2/236; B60N 2/2358; B60N 2/2356; B60N 2/22
See application file for complete search history.

(56) References Cited

U.S. PATENT DOCUMENTS

| | | | |
|---|---|---|---|
| 4,541,672 A * | 9/1985 | Fukuta | B60N 2/2352 297/366 |
| 6,543,849 B1 * | 4/2003 | Yamada | B60N 2/236 297/363 |
| 7,766,428 B2 | 8/2010 | Ng | |
| 8,251,451 B2 | 8/2012 | Dziedzic | |
| 8,556,340 B2 | 10/2013 | D Agostini | |
| 9,272,649 B2 | 3/2016 | Gallienne | |
| 9,371,015 B2 | 6/2016 | Matsui | |
| 2003/0227205 A1 | 12/2003 | Villarroel | |
| 2005/0264086 A1 | 12/2005 | Lofy | |
| 2007/0039183 A1 * | 2/2007 | Krambeck | B60N 2/22 29/897.2 |
| 2012/0280555 A1 * | 11/2012 | Blinzler | B60N 2/22 297/463.1 |

FOREIGN PATENT DOCUMENTS

| | | |
|---|---|---|
| DE | 60317192 T2 | 8/2008 |
| DE | 102011079693 A1 | 2/2012 |
| DE | 102012010107 A1 | 1/2013 |
| KR | 20170002012 A | 1/2017 |

OTHER PUBLICATIONS

German Search Report for German App. No. 10 2020 131 934.7 dated May 26, 2021, 12 pages, No English Translation Avaialble.

* cited by examiner

*Primary Examiner* — Milton Nelson, Jr.
(74) *Attorney, Agent, or Firm* — Barnes & Thornburg LLP

(57) ABSTRACT

An occupant support adapted for use in a vehicle includes a seat bottom coupled to a floor of the vehicle and a seat back configured to pivot about a seat-back pivot axis relative to the seat bottom between an upright position and a folded-forward position. The occupant support further includes a seat-motion controller configured to control movement of the seat back relative to the seat bottom.

20 Claims, 9 Drawing Sheets

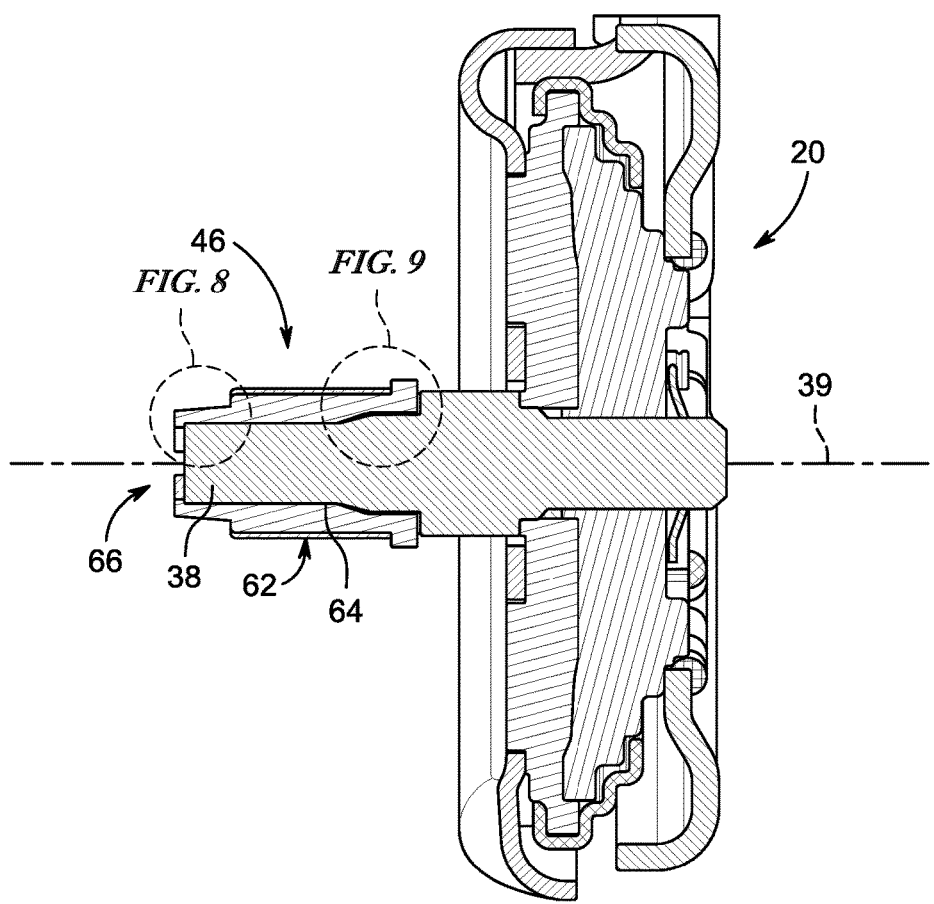
FIG. 7
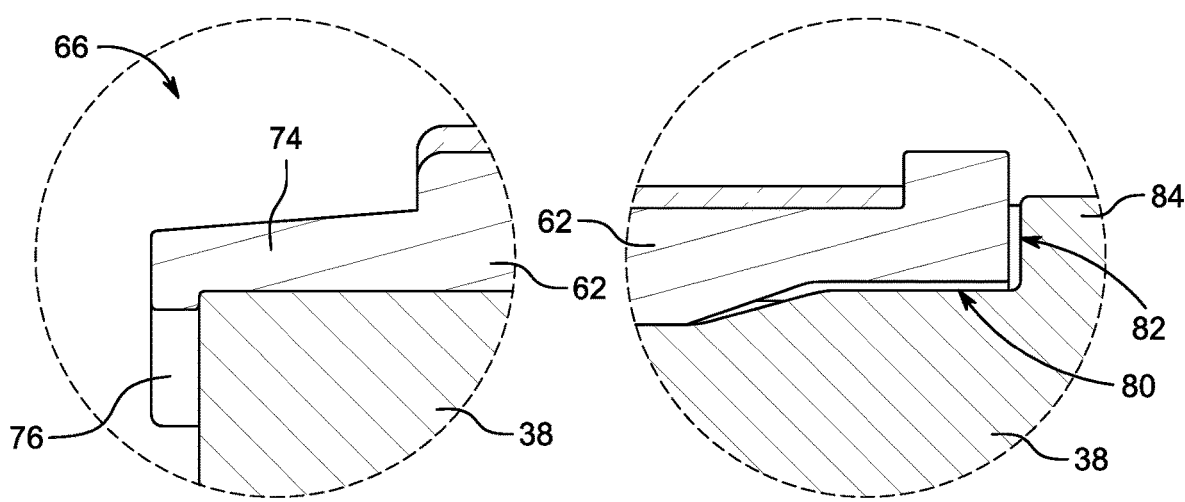
FIG. 8
FIG. 9

SHAFTED RECLINERS DUAL DECOUPLING SYSTEM

BACKGROUND

The present disclosure relates to occupant supports, and particularly to movable occupant supports. More particularly, the present disclosure relates to occupant supports with reclining seat backs for use in vehicles.

SUMMARY

According to the present disclosure, an occupant support includes a seat bottom, a seat back, and seat-motion controller. The seat back is coupled to the seat bottom for movement about a seat-back pivot axis relative to seat bottom. The seat-motion controller is configured to control movement of seat back about seat-back pivot axis relative to seat bottom.

In illustrative embodiments, the seat-motion controller includes a dual-recliner actuator that interconnects right and left recliners. The dual-recliner actuator provides means for changing the right and left recliners from a locked arrangement to an unlocked arrangement to allow pivotable movement of the seat back about the seat-back pivot axis. The dual-recliner actuator also provides means for changing the right and left recliners between the locked arrangement and the unlocked arrangement so that neither recliner blocks the other from reaching the locked arrangement.

In illustrative embodiments, the dual-recliner actuator includes a connector tube, an actuator lever coupled to the connector tube, a pair of lost-motion inserts, and a lever return spring. The connector tube interconnects the left recliner and the right recliner. The actuator lever is configured to move the connector tube from a locked position to a freed position to unlock right and left recliner locks and allow movement of the seat back about the seat back pivot axis. The actuator lever is biased by a torsion spring toward the locked position to maintain each recliner lock in the locked arrangement until the actuator lever is actuated as well as to neutralize an actuator lever inertial unlocking.

A left lost-motion insert is coupled to a left shaft and is moveable relative to the connector tube about the seat-back pivot axis. A right lost-motion insert is coupled to a right shaft and movable relative to the connector tube and the right lost-motion insert about the seat-back pivot axis. The left and right lost-motion inserts are configured to provide a lost-motion driving connection between the right recliner lock and the left recliner-lock to control unlocking and relocking of each recliner lock.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4A is a cross sectional view of the right and left lost-motion inserts and the connector tube showing an actuator lever engaged with a stop and suggesting that both recliner locks are in the locked arrangement while being arranged at an orientation relative to the connector tube that allows movement of the right and left recliner locks in both clockwise and counter-clockwise directions;

FIG. 4B is a cross sectional view of the right and left lost-motion inserts within the connector tube showing the actuator lever pivoted away from the stop and suggesting that the right and left recliner locks are moved to the unlocked arrangement as the connector tube moves in the unlocking direction and contacts the right and left lost-motion inserts at a first set of contact locations;

FIG. 4C is a cross sectional view of the right and left lost-motion inserts within the connector tube and suggesting that the connector tube is moving in the relocking direction to return both recliner locks to the locked arrangement as the connector tube contacts the right and left lost-motion inserts at a second set of contact locations different than the first set of contact locations;

FIG. 4D is a cross sectional view of the right and left lost-motion inserts within the connector tube and suggesting that the right recliner lock is in the locked arrangement while the left recliner lock is in the unlocked arrangement after the connector tube has moved in the relocking direction so that the actuator lever contacts the stop and showing the right and left lost motion inserts arranged at an orientation relative to the connector tube that allows movement of the right and left recliner locks in both clockwise and counter-clockwise directions so that neither recliner lock is prevented from returning to the locked arrangement;

FIG. 7 is a cross sectional view taken along line 7-7 in FIG. 6 showing the left lost-motion insert coupled to the left recliner-lock and including a plurality of arms that form an interference fit with the shaft;

FIG. 8 is an enlarged cross sectional view of a portion of FIG. 7 showing one of the plurality of arms engaged with the shaft;

FIG. 9 is an enlarged cross sectional view of another portion of FIG. 7 showing that a flange of the lost-motion insert is spaced apart from the shaft to provide a clearance gap therebetween;

DETAILED DESCRIPTION

Figure 1:
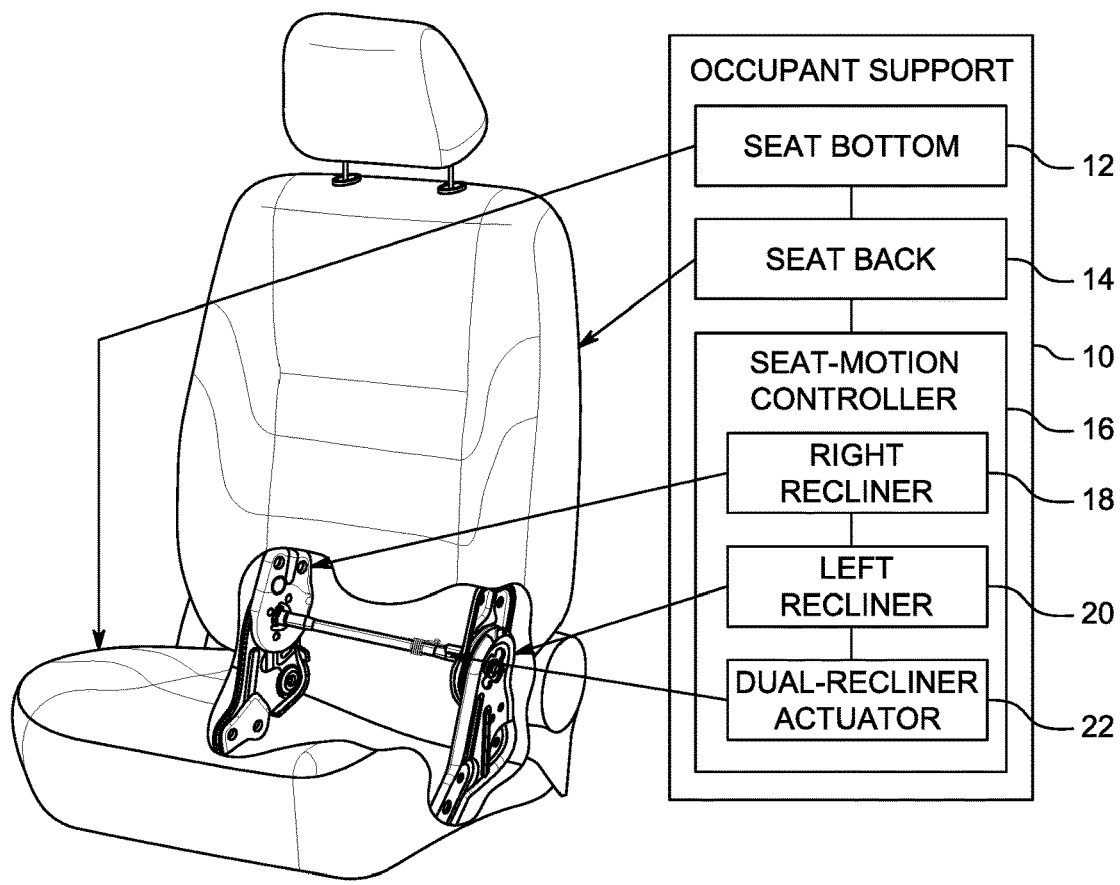
FIG. 1 is a perspective and diagrammatic view of an occupant support in accordance with the present disclosure, the occupant support has portions cut away and removed and includes a seat bottom, a seat back mounted to the seat bottom to pivot relative to the seat bottom, and a seat-motion controller coupled to the seat bottom and the seat back to control motion of the seat back about a seat-back pivot axis relative to the seat bottom, and showing that the seat motion controller includes a right recliner, a left recliner, and a dual-recliner actuator.
Figure 2:
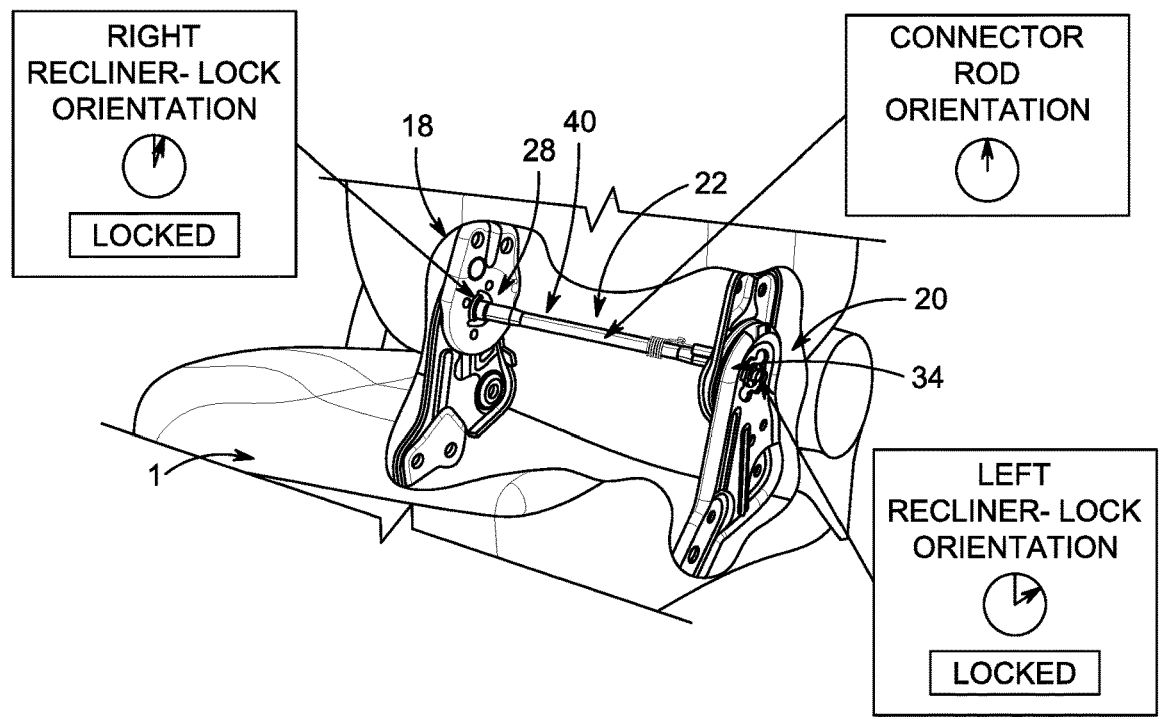
FIG. 2 is an enlarged view of a portion of FIG. 1 with diagrammatic representations showing that a right recliner-lock has a locking shaft angular orientation and is engaged to block movement of the seat back relative to the seat bottom, a left recliner-lock has another locking shaft angular orientation and is engaged to block movement of the seat back relative to the seat bottom, and a connector tube interconnecting the left and right recliner-locks has a third angular orientation.
Figure 3:
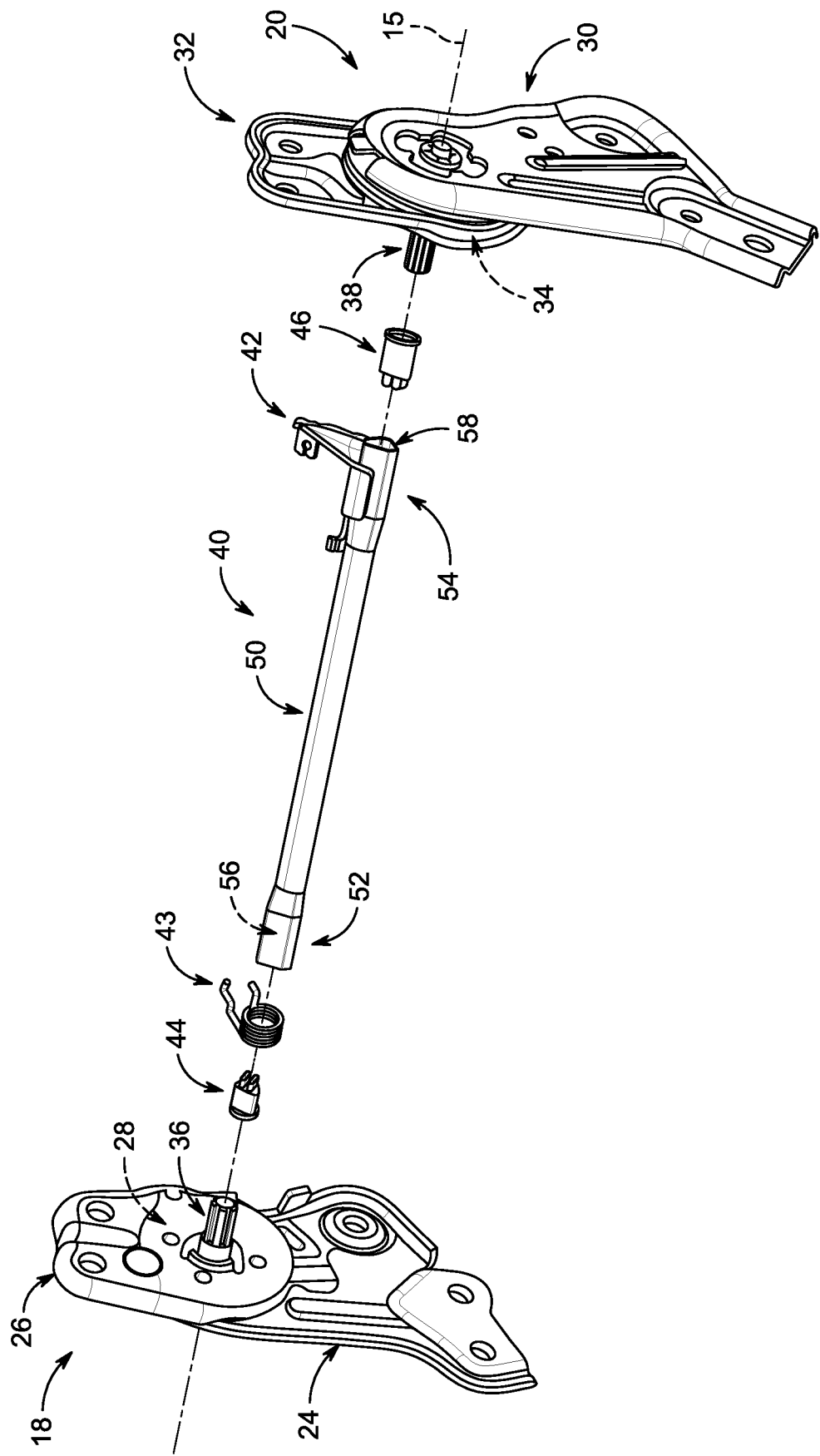
FIG. 3 is an exploded assembly view of the seat motion controller showing that the dual-recliner actuator includes a right lost-motion insert configured to be coupled to the right recliner, a left lost-motion insert configured to be coupled to the left recliner, and the connector tube coupled to the right and left lost-motion inserts to provide a lost-motion driving connection between the right recliner and the left recliner.

An occupant support 10 in accordance with the present disclosure is adapted for use in a vehicle as shown in FIGS. 1-3. The occupant support 10 includes a seat bottom 12, a seat back 14, and seat-motion controller 16 as shown in FIGS. 1-3. The seat back 14 is coupled to the seat bottom 12 for movement about a seat-back pivot axis 15 relative to seat bottom 12. The seat-motion controller 16 is configured to provide means for controlling movement of seat back 14 about seat-back pivot axis 15 relative to seat bottom 12. The seat-motion controller 16 includes a dual-recliner actuator 22 that interconnects right and left recliners 18, 20. The dual-recliner actuator 22 provides means for changing the right and left recliners 18, 20 from a locked arrangement to an unlocked arrangement to allow pivotable movement of the seat back 14 about the seat-back pivot axis 15 as suggested in FIGS. 4A-4B. The dual-recliner actuator 22 also provides means for preventing the right and left recliners 18, 20 from blocking each other from returning to the locked arrangement as suggested in FIGS. 4C-4D.

The seat-motion controller 16 includes right recliner 18, left recliner 20, and dual-recliner actuator 22 as shown in FIGS. 1-3. The right recliner 18 is arranged generally along a right side of the occupant support 10 when viewed from a perspective of an occupant seated on the occupant support 10. The left recliner 20 is arranged generally along a left side of the occupant support 10 when viewed from the perspective of an occupant seated on the occupant support 10. It should be noted that the right and left recliners 18, 20 may be interchangeable. The dual-recliner actuator 22 extends along the seat-back pivot axis 15 and interconnects the right and left recliners 18, 20. The right and left recliners 18, 20 are substantially similar to one another in the illustrative embodiment, however, in some embodiments the right and left recliners 18, 20 may be different from one another.

The right and left recliners 18, 20 interconnect the seat back 14 and the seat bottom 12 to allow movement of the seat back 14 about the seat-back pivot axis 15 as suggested in FIGS. 1 and 2. The right recliner 18 includes a right fixed flange 24 coupled to the seat bottom 12, a right mobile flange 26 coupled to the seat back 14, and a right recliner lock 28. The right fixed flange 24 is configured to remain stationary relative to the seat bottom 12 as the seat back 14 moves about the seat-back pivot axis 15. The mobile flange 26 is configured to move with the seat back 14 about the seat-back pivot axis 15. The right recliner lock 28 may be actuated by the dual-recliner actuator 22 to change the right recliner lock 28 from a locked arrangement to an unlocked arrangement.

The left recliner 20 includes a left fixed flange 30 coupled to the seat bottom 12, a left mobile flange 32 coupled to the seat back 14, and a left recliner lock 34 as shown in FIGS. 1 and 2. The left fixed flange 30, the left mobile flange 32, and the left recliner lock 34 are substantially similar to right fixed flange 24, the right mobile flange 26, and the right recliner lock 28 of right recliner 18 and operate in the same manner. The right and left recliner locks 28, 34 are configured to engage the mobile flanges 26, 32 in the locked arrangement to block pivotable movement of the seat back 14 and the mobile flanges 26, 32 about the seat-back pivot axis 15. The right and left recliner locks 28, 34 disengage to allow pivotable movement of the seat back about the seat-back pivot axis in the unlocked arrangement.

The right recliner lock 28 includes a right shaft 36 and the left recliner lock 34 includes a left shaft 38. The right and left shafts 36, 38 are engaged by the dual-recliner actuator 22 and may be actuated to change the right and left recliner locks 28, 34 from the locked to the unlocked arrangement. The right and left recliner locks 28, 34 may include movable components that are actuated thru rotation of the right and left recliner shafts 36, 38 from the locked to the unlocked arrangement. The dual-recliner actuator 22 is configured to rotate each of the shafts 36, 38 about the seat-back pivot axis 15 to change each of the recliner locks 28, 34 from the locked arrangement to the unlock arrangement so that the seat back 14 is free to pivot relative to the seat bottom 12.

The dual-recliner actuator 22 is configured to provide a lost-motion driving connection between the right recliner lock 28 and the left recliner-lock 34 as suggested in FIG. 2. Due to manufacturing tolerances and/or seat back twist, the right recliner shaft 36 and the left recliner shaft 38 may be arranged at different angular orientations relative to one another during relocking. This may cause the right recliner lock 28 and the left recliner lock 34 to change between the locked arrangement and the unlocked arrangement at different angular orientations. Absent the dual-recliner actuator 22, the right or the left recliner lock 28, 34 could prevent the other from returning to the locked arrangement due to the different angular orientations at which they return to the locked arrangement. The lost-motion driving connection provided by the dual-recliner actuator 22 allows each recliner lock 28, 34 to change between the locked and unlocked arrangements so that neither recliner lock 28, 34 blocks the other from returning to the locked arrangement.

Figure 4A:
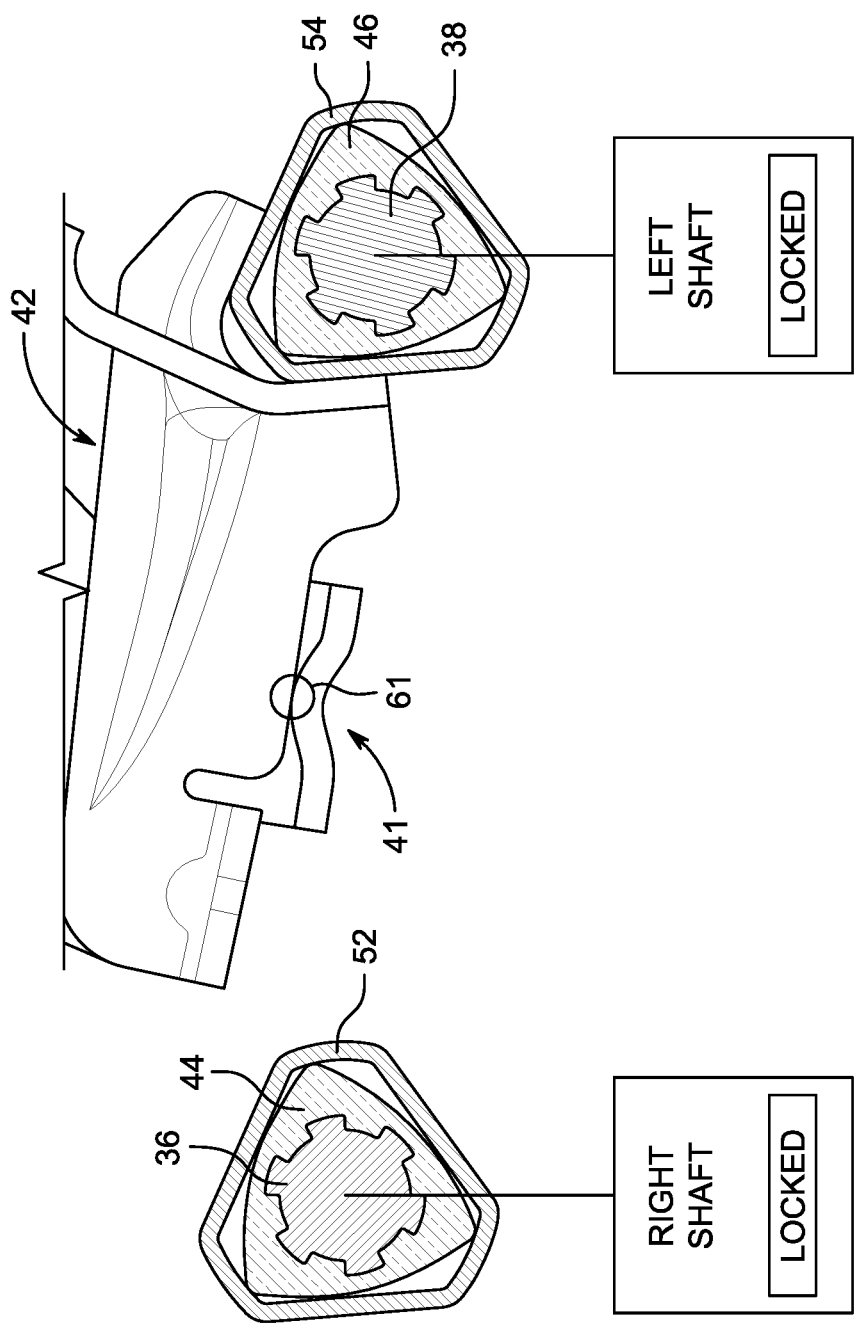
FIGS. 4A-4D are a series of cross sectional views of the right and left lost-motion inserts within the connector tube suggesting that the right and left lost-motion inserts allow each recliner lock to change from the locked arrangement to the unlocked arrangement as they are rotated in an unlocking direction and to move relative to the connector tube so that neither recliner lock prevents the other from returning to the locked arrangement as the lost-motion inserts are rotated in a relocking direction.
Figure 4B:
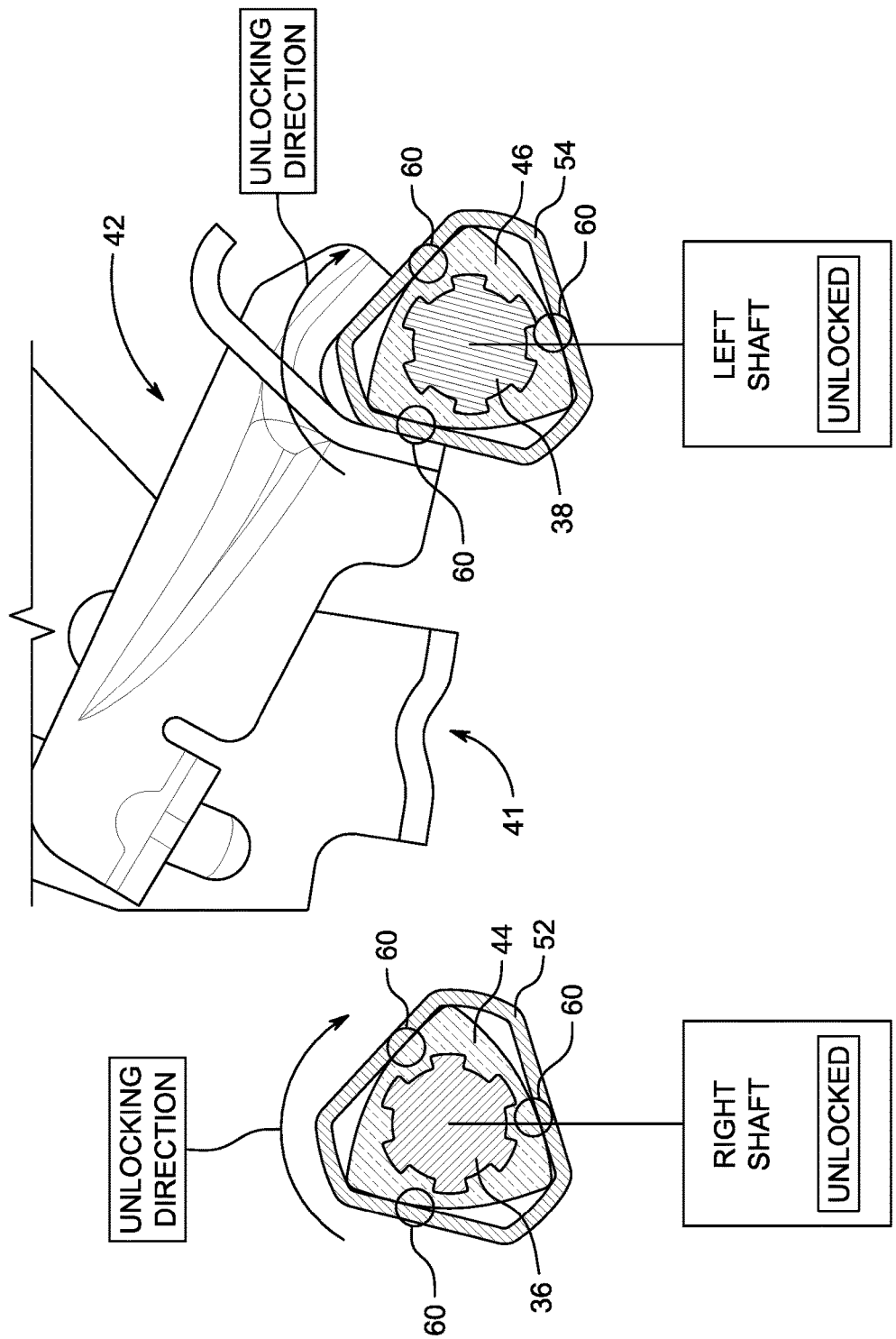

The dual-recliner actuator 22 includes a connector tube 40, an actuator lever 42 coupled to the connector tube 40, and a pair of lost-motion inserts 44, 46 as shown in FIGS. 2 and 3. The connector tube 40 interconnects the right recliner shaft 36 and the left recliner-shaft 38. The actuator lever 42 is configured to move the connector tube 40 from a locked position (as shown in FIG. 4A), in which the right and left recliner locks 28, 34 are in the locked arrangement, to a freed position (as shown in FIG. 4B), in which the right and left recliner locks 28, 34 are in the unlocked arrangement. The actuator lever 42 is biased by a torsion spring 43 toward the locked position to maintain each recliner lock in the locked arrangement until the actuator lever 42 is actuated. A right lost-motion insert 44 is coupled to the right shaft 36 and is moveable relative to the connector tube 40 about the seat-back pivot axis 15 in both clockwise and counter-clockwise directions. A left lost-motion insert 46 is coupled to the left shaft 34 and movable relative to the connector tube 40 and the right lost-motion insert 44 about the seat-back pivot axis 15 in both clockwise and counter-clockwise directions. The right and left lost-motion inserts 44, 46 are fixed to their respective shaft 36, 38 to assume the same angular orientation as the shafts 36, 38 as suggested in FIGS. 2 and 3.

The right and left lost-motion inserts 44, 46 are sized relative to the connector tube 40 so that the connector tube 40 may assume an angular orientation that is different than both the right recliner lock 28 and the left recliner lock 34 as suggested in FIG. 2. The connector tube 40 includes a tube body 50, a right lost-motion end 52, and a left lost motion end 54. The tube body 50 has a generally cylindrical cross-sectional shape. The right lost-motion end 52 defines a right insert-receiving space 56 that receives the right lost-motion insert 44. The left lost-motion end 54 defines a left insert-receiving space 58 that is positioned in a direction opposite the right insert-receiving space 56 and receives the left lost-motion insert 46.

Figure 4C:
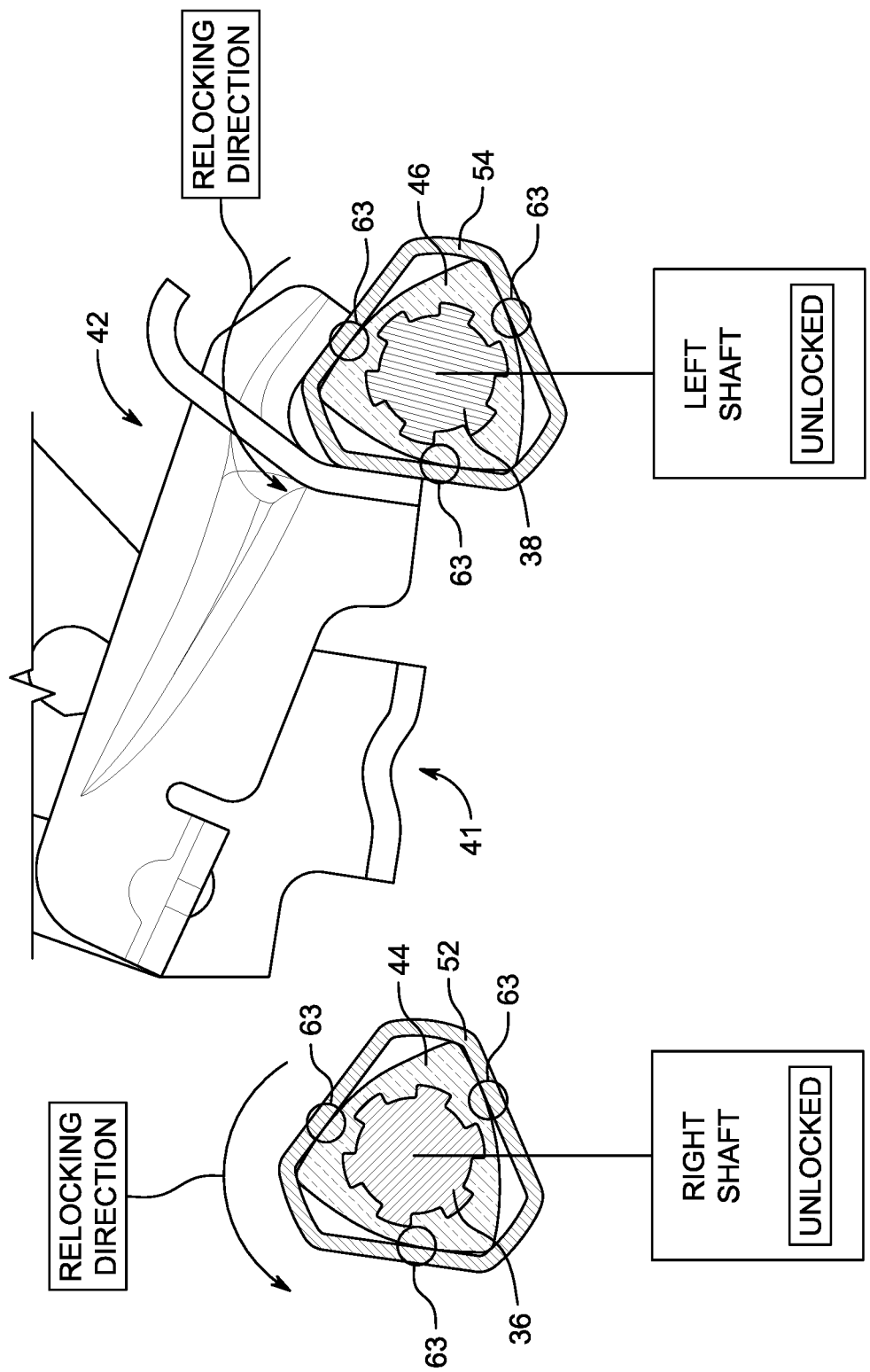

The right and left insert-receiving spaces 56, 58 of the connector tube 40 have a first cross sectional area while the right and left lost-motion inserts 44, 46 have a second cross sectional shape that is less than the first cross sectional area. In the illustrative embodiment, the first cross sectional area and the second cross sectional shape are generally triangular shaped as shown in FIGS. 4A-4D. The difference in size and shape of the first cross sectional area compared to the second cross sectional shape permits rotation of the connector tube 40 relative to the right and left lost-motion inserts 44, 46 within a predetermined range of rotation. Once the connector tube 40 has rotated past the predetermined range of rotation for each lost-motion insert 44, 46, the right-lost motion end 52 and the left lost-motion end 54 contact each respective lost-motion insert 44, 46 as shown in FIGS. 4B and 4C. Further rotation of the connector tube 40 after the right and left lost-motion ends 52, 54 contact the lost-motion inserts 44, 46 will cause the right and left shafts to disengage so that the right and left recliner locks assume the unlocked arrangement. The predetermined range of rotation of the connector tube 40 relative to the right lost-motion insert 44 may be different compared to the predetermined range of rotation relative to the left lost-motion insert 46 depending on the angular orientation of the right shaft 36 compared to the left shaft 38.

Figure 4D:
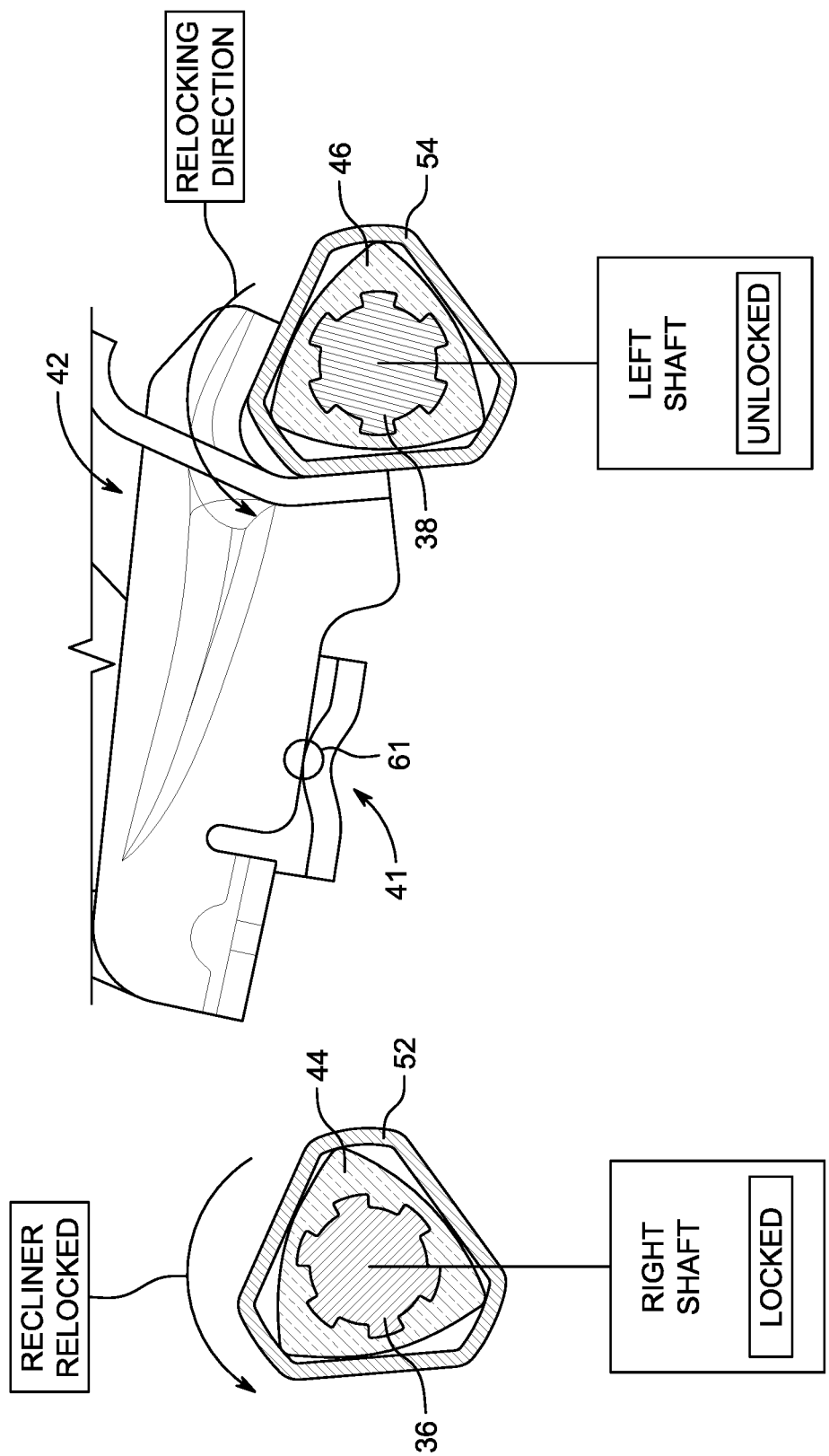

FIGS. 4A-4D illustrate one example of an arrangement of the right and left lost-motion inserts 44, 46 relative to the connector tube 40. Each lost-motion insert 44, 46 is shown relative to its corresponding lost-motion end 52, 54 as the connector tube 40 is pivoted by the actuator lever 42 to move the right and left shafts 36, 38 in an unlocking direction (clockwise direction), as shown in FIG. 4B, and a relocking direction (counter-clockwise direction), as shown in FIGS. 4C and 4D.

The right and left lost-motion inserts 44, 46 are arranged within their corresponding lost-motion end 52, 54 of the connector tube 40 in FIGS. 4A-4D. In the locked position, the actuator lever 42 is biased by the torsion spring 43 into contact with a stop 41 at a contact point 61 as shown in FIG. 4A. In this position, the right and left lost-motion inserts 44, 46 are arranged at an orientation relative to the connector tube 40 that allows each lost motion insert 44, 46 to rotate relative to the ends 52, 54 of the connector tube 40 in both clockwise and counter-clockwise directions. Illustratively, the lost-motion inserts 44, 46 are sized and arranged relative to the connector tube 40 to allow for a 4 degree rotation in the clockwise direction and a 22 degree rotation in the counter-clockwise direction before contacting the connector tube 40. However, in other embodiments, any suitable degree of rotation in the clockwise and counter-clockwise directions may be used.

As the actuator lever 42 is moved to the freed position, the actuator lever disengages the stop 41 and rotates the connector tube 40 in the unlocking direction into contact with each lost-motion insert 44, 46 as shown in FIG. 4B. The ends 52, 54 of the connector tube 40 contact each respective lost-motion insert 44, 46 at contact points 60 such that further rotation of the connector tube 40 in the unlocking direction moves the right and left shafts 36, 38 with the connector tube 40. This motion changes the right and left recliner locks 28, 34 to the unlocked arrangement to allow pivotable movement of the seat back 14 about the axis 15.

The actuator lever 42 and the connector tube 40 are biased in the relocking direction by the torsion spring 43 to automatically return the connector tube 40 to the locked position as suggested in FIGS. 4C and 4D. As the connector tube 40 is moved in the relocking direction, the ends 52, 54 of the connector tube 40 move relative to the lost-motion inserts 44, 46 until the ends contact the lost-motion inserts at a second set of contact points 63. Further rotation of the connector tube 40 in the relocking direction moves the lost-motion inserts 44, 46 and the shafts 36, 38 with the connector tube 40 in the relocking direction until each recliner lock reaches the locked arrangement.

In some instances, manufacturing tolerances may result in one of the recliner locks returning to the locked arrangement before the other as suggested in FIG. 4D. The actuator lever 42 is in the locked position in contact with stop 41 and, illustratively, the right recliner lock 28 is in the locked arrangement while the left recliner lock 34 remains in the unlocked arrangement. Both lost-motion inserts 44, 46 are allowed to rotate relative to the connector tube 40 in this position so that the left recliner lock 34 may be moved even with the actuator lever in the locked position to return the left recliner lock 34 to the locked arrangement. In one example, an external force on the seat back 14 causes additional movement of the left recliner lock 34 with the actuator lever 42 in the locked position to return the left recliner lock 34 to the locked arrangement. In this way, the dual recliner actuator 22 prevents each recliner lock from being blocked from returning to the locked arrangement.

Figure 5:
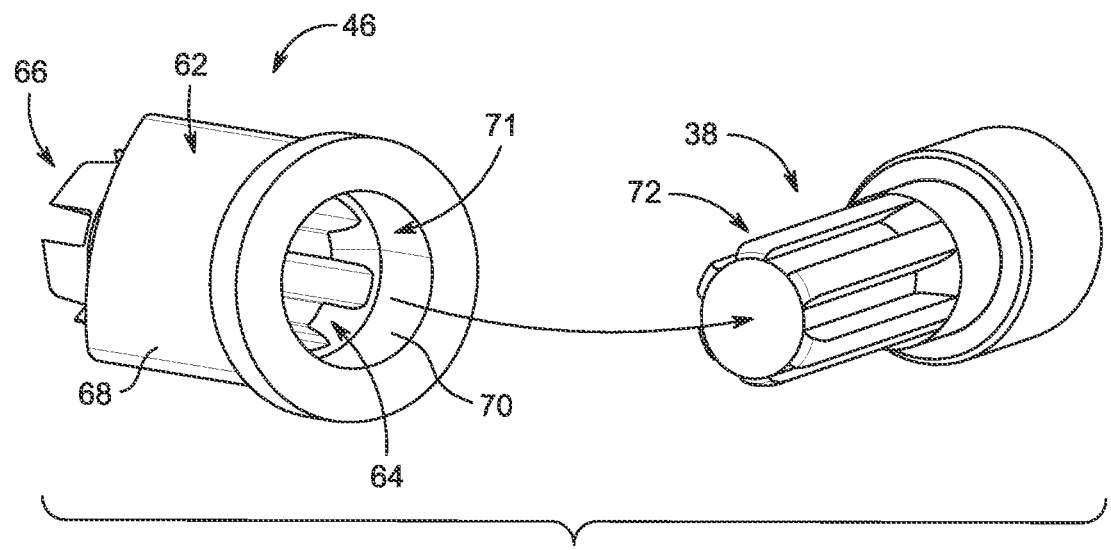
FIG. 5 is an exploded assembly view of the left lost-motion insert and a shaft of the left recliner-lock with an arrow suggesting that the left lost-motion insert is configured to couple to the shaft of the left recliner lock.
Figure 6:
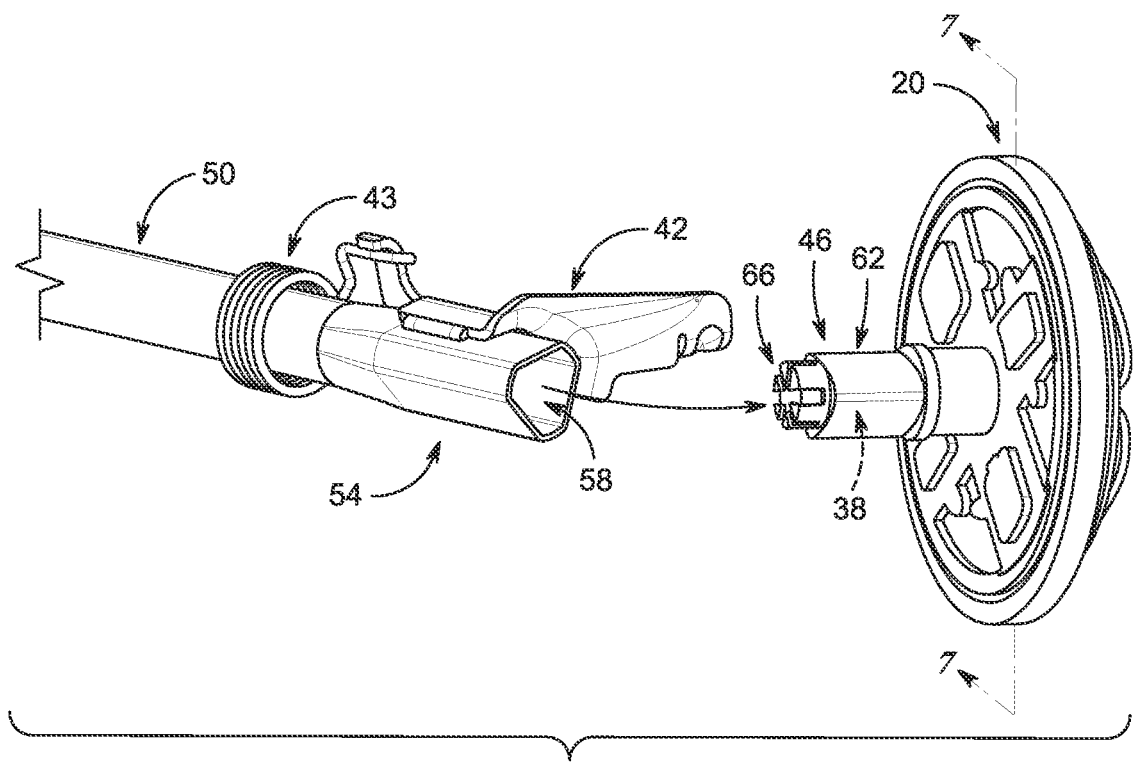
FIG. 6 is a partial exploded assembly view showing the left lost-motion insert coupled to the shaft of the left-recliner lock and suggesting that the connector tube is configured to receive the left lost-motion insert to couple to the connector tube to the left recliner-lock.

Each lost-motion insert 44, 46 includes a body 62, a plurality of splines 64, and a plurality of flex fingers 66 (also called arms 66) as shown in FIGS. 5 and 6. Only lost-motion insert 46 is shown in FIGS. 5 and 6 because lost-motion insert 44 is identical to lost-motion insert 46. The body 62 has an external surface 68 that engages its respective end 54 of the connector tube 40 as described above. The body 62 also has an internal surface 70 defining a passageway 71 that receives the left shaft 38 as suggested in FIG. 5. The plurality of splines 64 are coupled to the internal surface 70 in mating arrangement with corresponding splines 72 on the shaft 38. The plurality of splines 64 cooperate with the corresponding splines 72 on the shaft 38 to transmit torque between the lost-motion insert 46 and the shaft 38. The plurality of arms 66 extend from the body 62 of the insert 46 toward the tube body 50.

The lost-motion insert 46 is configured to slide onto the shaft 38 along a shaft axis 39 as shown in FIGS. 6 and 7. The lost-motion insert 46 is sized relative to the shaft 38 to provide a friction-interference fit between the lost-motion insert 46 and the shaft 38 as suggested in FIGS. 7-9. The plurality of flex fingers 66 are spaced apart from one another circumferentially around a tip of the shaft 38. The plurality of flex fingers 66 each include an flex fingers body 74 and a projection 76 as shown in FIGS. 7 and 8. The flex fingers body 74 extends away from the body 62 of the insert 46 toward the tube body 50. The projection 76 extends inwardly from the arm body 74 toward the shaft axis 39 and establishes a lost-motion insert stop. Each arm provides a compressive force on the shaft 38 when installed to form the friction-interference fit with the shaft 38 retain the insert 46 to the shaft 38.

The body 62 of the lost-motion insert 46 has an inner diameter that is slightly greater than an outer diameter of the shaft 38 as shown in FIG. 9. The difference in diameters provides a small clearance gap 80 radially between the shaft 38 and the lost-motion insert 46 to accommodate size variations in the shaft 38. A second clearance gap 82 is established axially between the body 62 of the lost-motion insert 46 and a flange 84 of the shaft 38. The gap 82 accommodates length variations in the shaft 38.

Figure 10:
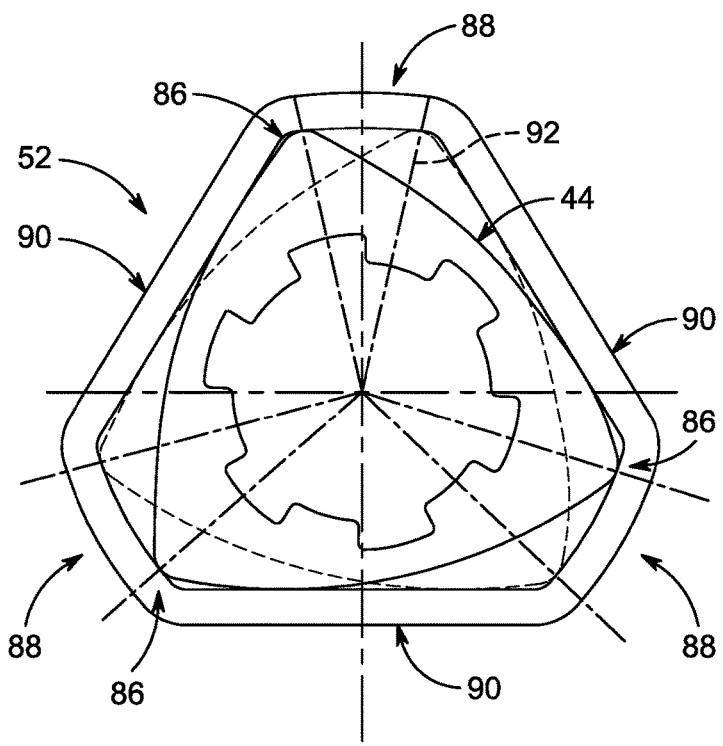
FIG. 10 is a cross sectional view of one of the lost-motion inserts received in the connector tube suggesting that the lost-motion insert has a range of motion relative to the connector tube.

As discussed above, the lost-motion inserts 44, 46 have a generally triangular shaped cross section provided by three projections 86 as shown in FIG. 10. Each lost-motion end 52, 54 of the connector tube 40 includes three tip sections 88 interposed between three blocker sections 90. The three projections 86 of the lost-motion inserts 44, 46 point toward a respective tip section 88. Each lost-motion insert 44, 46 is movable relative to the connector tube 40 such that the projections 86 travel between adjacent blocker sections 90 within the predetermined range of motion 92 to provide the lost motion driving connection described above. Each lost-motion insert 44, 46 contacts the blocker sections 90 as the connector tube 40 is rotated relative to the insert 44, 46 to change right and left recliner locks 28, 34 from the locked arrangement to the unlocked arrangement. In the illustrative embodiment, the predetermined range of motion is equal to about 26 degrees, however, any suitable range of motion may be used in other embodiments.

Figure 11:
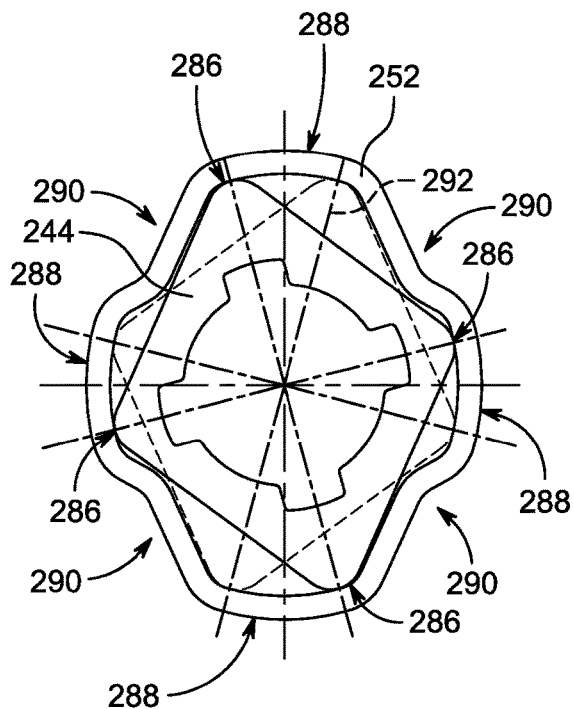
FIG. 11 is a cross sectional view of a second embodiment of a lost-motion insert and a connector tube suggesting that the lost-motion insert has a range of motion of the lost-motion insert relative to the connector tube.
Figure 12:
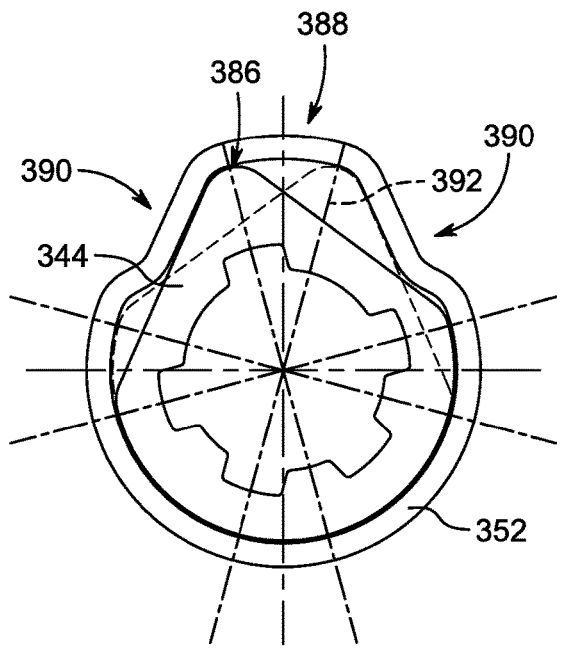
FIG. 12 is a cross sectional view of a third embodiment of a lost-motion insert and a connector tube suggesting that the lost-motion insert has a range of motion of the lost-motion insert relative to the connector tube.

The shape of the lost-motion inserts 44, 46 may vary as suggested in FIGS. 11 and 12. The shape of the lost-motion ends 52, 54 of the connector tube 40 may also change to match the shape of the lost-motion inserts 44, 46 and to provide the lost motion driving connection described above.

Another embodiment of a lost-motion insert 244 and a corresponding lost-motion end 252 is shown in FIG. 11. The lost-motion insert 244 includes four projections 286. The lost motion end 252 includes four tip sections 288 interposed between four blocker sections 290. The four projections 286 of the lost motion insert 244 point toward a respective tip section 288. The lost-motion insert 244 is movable relative to the connector tube 40 such that the projections 286 travel between adjacent blocker sections 290 within a predetermined range of motion 292 to provide the lost motion driving connection described above. The lost-motion insert 244 contacts the blocker sections 290 as the connector tube 40 is rotated relative to the insert 244 to change right and left recliner locks 28, 34 from the locked arrangement to the unlocked arrangement. In the illustrative embodiment, the predetermined range of motion 292 is equal to about 30 degrees, however, any suitable range may be used.

Another embodiment of a lost-motion insert 344 and a corresponding lost-motion end 352 is shown in FIG. 12. The lost-motion insert 344 includes a single projection 386. The lost motion end 352 includes a single tip section 388 interposed between a pair of blocker sections 390. The projection 386 of the lost motion insert 344 points toward the tip section 388. The lost-motion insert 344 is movable relative to the connector tube 40 such that the projection 386 travels between the adjacent blocker sections 390 within a predetermined range of motion 392 to provide the lost motion driving connection described above. The lost-motion insert 344 contacts the blocker sections 390 as the connector tube 40 is rotated relative to the insert 344 to change right and left recliner locks 28, 34 from the locked arrangement to the unlocked arrangement. In the illustrative embodiment, the predetermined range of motion 392 is equal to about 30 degrees, however, any suitable range may be used.

The following numbered clauses include embodiments that are contemplated and non-limiting:

Clause 1. An occupant support comprises a seat bottom and a seat back coupled to the seat bottom for pivotable movement about a seat-back pivot axis relative to the seat bottom.

Clause 2. The occupant support of clause 1, or any other suitable clause or combination of clauses, further comprising a seat-motion controller configured to control pivotable movement of the seat back relative to the seat bottom, the seat-motion controller including a right recliner with a right recliner-lock, a left recliner with a left recliner-lock, and a dual-recliner actuator configured rotate about an actuator pivot axis to change the right recliner-lock and the left recliner-lock from a locked arrangement where pivotable movement of the seat back about the seat-back pivot axis is blocked and an unlocked arrangement where pivotable movement of the seat back about the seat-back pivot axis is permitted.

Clause 3. The occupant support of clause 2, or any other suitable clause or combination of clauses, wherein the dual-recliner actuator is configured to provide a lost-motion driving connection between the right recliner-lock and the left recliner-lock that allows each recliner lock to move between the locked arrangement and the unlocked arrangement independently of one another so that neither recliner lock blocks the other recliner lock from returning to the locked arrangement.

Clause 4. The occupant support of clause 3, or any other suitable clause or combination of clauses, wherein dual-recliner actuator includes a connector tube that interconnects the right recliner-lock and the left recliner-lock, an actuator lever coupled to the connector tube, a right lost-motion insert coupled to the right recliner-lock and moveable relative to the connector tube, and a left lost-motion insert coupled to the left recliner-lock and movable relative to the connector tube.

Clause 5. The occupant support of clause 4, or any other suitable clause or combination of clauses, wherein connector tube includes a tube body with a generally cylindrical cross-sectional shape, a right lost-motion end defining a right insert-receiving space, and a left lost-motion end defining a left insert-receiving space opposite the right lost-motion end.

Clause 6. The occupant support of clause 5, or any other suitable clause or combination of clauses, wherein the right and left insert-receiving spaces have a first cross sectional area and the right and left lost-motion inserts have a second cross sectional shape that is less than the first cross sectional area.

Clause 7. The occupant support of clause 6, or any other suitable clause or combination of clauses, wherein the first cross sectional area and the second cross sectional shape are generally triangular shaped.

Clause 8. The occupant support of clause 4, or any other suitable clause or combination of clauses, wherein each lost-motion insert includes a body, a plurality of splines, and a plurality of flex fingers, the body having an external surface that engages the connector tube and an internal surface defining a passageway that receives a corresponding shaft, the plurality of splines coupled to the internal surface in mating arrangement with corresponding splines on the shaft.

Clause 9. The occupant support of clause 8, or any other suitable clause or combination of clauses, wherein the plurality of flex fingers form a friction-interference fit with the shaft.

Clause 10. An occupant support comprising a seat bottom, a seat back coupled to the seat bottom for movement about a seat-back pivot axis relative to the seat bottom to change an angle of the seat back relative to the seat bottom, and a seat-motion controller configured to control pivotable movement of the seat back relative to the seat bottom, the seat-motion controller including a right recliner with a right recliner-shaft, a left recliner with a left recliner-shaft, and a dual-recliner actuator configured to change the right and left recliner-shafts between a locked arrangement in which pivotable movement of the seat back about the seat-back pivot axis is blocked and a unlocked arrangement in which pivotable movement of the seat back about the seat-back pivot axis is allowed, wherein dual-recliner actuator includes a connector tube that interconnects the right recliner-shaft and the left recliner-shaft, an actuator lever coupled to the connector tube and configured to move the connector tube from a locked position to a freed position, a right lost-motion insert coupled to the right recliner-lock and moveable relative to the connector tube, and a left lost-motion insert coupled to the left recliner-lock and movable relative to the connector tube.

Clause 11. The occupant support of clause 10, or any other suitable clause or combination of clauses, wherein the actuator lever is coupled to a torsion spring to bias the connector tube toward the locked position.

Clause 12. The occupant support of clause 11, or any other suitable clause or combination of clauses, wherein connector tube includes a tube body with a generally cylindrical cross-sectional shape, a right lost-motion end defining a right insert-receiving space, and a left lost-motion end defining a left insert-receiving space opposite the right lost-motion end.

Clause 13. The occupant support of clause 12, or any other suitable clause or combination of clauses, wherein the right and left insert-receiving spaces have a first cross sectional area and the right and left lost-motion inserts have a second cross sectional shape with an area that is less than the first cross sectional area.

Clause 14. The occupant support of clause 13, or any other suitable clause or combination of clauses, wherein the first cross sectional area and the second cross sectional shape are generally triangular shaped.

Clause 15. The occupant support of clause 12, or any other suitable clause or combination of clauses, wherein each lost-motion insert includes a body, a plurality of splines, and a plurality of flex fingers, the body having an external surface that engages the connector tube and an internal surface defining a passageway that receives a corresponding shaft, the plurality of splines coupled to the internal surface in mating arrangement with corresponding splines on the shaft.

Clause 16. The occupant support of clause 15, or any other suitable clause or combination of clauses, the plurality of arms form a friction-interference fit with the shaft.

Clause 18. An occupant support comprising a seat bottom, a seat back coupled to the seat bottom for pivotable movement about a seat-back pivot axis relative to the seat bottom, and a seat-motion controller configured to control pivotable movement of the seat back relative to the seat bottom, the seat-motion controller including a right recliner arranged along a right lateral side of the seat back, a left recliner arranged along a left lateral side of the seat back, and a dual-recliner actuator that interconnects the right recliner and the left recliner and provides means for changing the right and left recliners between a locked arrangement and an unlocked arrangement so that neither recliner blocks the other from reaching the locked arrangement as the right and left recliners move from the unlocked arrangement to the locked arrangement.

Clause 19. The occupant support of clause 18, or any other suitable clause or combination of clauses, the right and left recliners each include a fixed flange coupled to the seat bottom, a mobile flange coupled to the seat back and configured to move relative to the fixed flange, and a recliner lock configured to block pivotable movement of the seat back in the locked arrangement and a allow pivotable movement of the seat back about the seat-back pivot axis in the unlocked arrangement.

Clause 20. The occupant support of clause 19, or any other suitable clause or combination of clauses, the dual-recliner actuator includes a connector tube interconnecting the right and left recliners and arranged at a right locking shaft angular orientation, a right lost-motion insert coupled to the recliner-lock of the right recliner and arranged at a left locking shaft angular orientation, and a left lost-motion insert coupled to the recliner-lock of the left recliner and arranged at a third angular orientation.

Clause 21. The occupant support of clause 20, or any other suitable clause or combination of clauses, wherein the right lost-motion insert and the left lost-motion insert are movable relative to one another and relative to the connector tube.

Clause 22. The occupant support of clause 20, or any other suitable clause or combination of clauses, wherein each lost-motion insert includes a body, a plurality of splines, and a plurality of flex fingers, the body having an external surface that engages the connector tube and an internal surface defining a passageway that receives a corresponding shaft, the plurality of splines coupled to the internal surface in mating arrangement with corresponding splines on the shaft.

Clause 23. The occupant support of clause 22, or any other suitable clause or combination of clauses, wherein the plurality of flex fingers form a friction-interference fit with the shaft.

The invention claimed is:
1. An occupant support comprising
a seat bottom,
a seat back coupled to the seat bottom for pivotable movement about a seat-back pivot axis relative to the seat bottom, and
a seat-motion controller configured to control pivotable movement of the seat back relative to the seat bottom, the seat-motion controller including a right recliner with a right recliner-lock, a left recliner with a left recliner-lock, and a dual-recliner actuator configured to rotate about an actuator pivot axis to change the right recliner-lock and the left recliner-lock from a locked arrangement where pivotable movement of the seat back about the seat-back pivot axis is blocked and an unlocked arrangement where pivotable movement of the seat back about the seat-back pivot axis is permitted, and wherein the dual-recliner actuator is configured to provide a lost-motion driving connection between the dual-recliner actuator and both the right recliner-lock and the left recliner-lock, and wherein the dual-recliner actuator allows each recliner-lock to move between the locked arrangement and the unlocked arrangement independently of one another so that neither recliner-lock blocks the other recliner-lock from returning to the locked arrangement.

2. The occupant support of claim 1, wherein the dual-recliner actuator includes a connector tube that interconnects the right recliner-lock and the left recliner-lock, an actuator lever coupled to the connector tube, a right lost-motion insert coupled to the right recliner-lock and moveable relative to the connector tube, and a left lost-motion insert coupled to the left recliner-lock and movable relative to the connector tube.

3. The occupant support of claim 2, wherein the connector tube includes a tube body with a generally cylindrical cross-sectional shape, a right lost-motion end defining a right insert-receiving space, and a left lost-motion end defining a left insert-receiving space opposite the right lost-motion end.

4. The occupant support of claim 3, wherein the right and left insert-receiving spaces have a first cross sectional area and the right and left lost-motion inserts have a second cross sectional shape with an area that is less than the first cross sectional area.

5. The occupant support of claim 4, wherein the first cross sectional area and the second cross sectional shape are generally triangular shaped.

6. The occupant support of claim 2, wherein each lost-motion insert includes a body, a plurality of splines, and a plurality of flex fingers, the body having an external surface that engages the connector tube and an internal surface defining a passageway that receives a corresponding shaft, the plurality of splines coupled to the internal surface in mating arrangement with corresponding splines on the shaft.

7. The occupant support of claim 6, wherein the plurality of flex fingers form a friction-interference fit with the shaft.

8. An occupant support comprising
a seat bottom,
a seat back coupled to the seat bottom for movement about a seat-back pivot axis relative to the seat bottom to change an angle of the seat back relative to the seat bottom, and
a seat-motion controller configured to control pivotable movement of the seat back relative to the seat bottom, the seat-motion controller including a right recliner with a right recliner-shaft, a left recliner with a left recliner-shaft, and a dual-recliner actuator configured to change the right and left recliner-shafts between a locked arrangement in which pivotable movement of the seat back about the seat-back pivot axis is blocked and a unlocked arrangement in which pivotable movement of the seat back about the seat-back pivot axis is allowed, wherein the dual-recliner actuator includes a connector tube that interconnects the right recliner-shaft and the left recliner-shaft, an actuator lever coupled to the connector tube and configured to move the connector tube from a locked position to a freed position, a right lost-motion insert coupled to the right recliner-lock and moveable relative to the connector tube, and a left lost-motion insert coupled to the left recliner-lock and movable relative to the connector tube.

9. The occupant support of claim 8, wherein the actuator lever is coupled to a torsion spring to bias the connector tube toward the locked position.

10. The occupant support of claim 9, wherein the connector tube includes a tube body with a generally cylindrical cross-sectional shape, a right lost-motion end defining a right insert-receiving space, and a left lost-motion end defining a left insert-receiving space opposite the right lost-motion end.

11. The occupant support of claim 10, wherein the right and left insert-receiving spaces have a first cross sectional area and the right and left lost-motion inserts have a second cross sectional shape with an area that is less than the first cross sectional area.

12. The occupant support of claim 10, wherein the first cross sectional area and the second cross sectional shape are generally triangular shaped.

13. The occupant support of claim 9, wherein each lost-motion insert includes a body, a plurality of splines, and a plurality of flex fingers, the body having an external surface that engages the connector tube and an internal surface defining a passageway that receives a corresponding shaft, the plurality of splines coupled to the internal surface in mating arrangement with corresponding splines on the shaft.

14. The occupant support of claim 13, wherein the plurality of flex fingers form a friction-interference fit with the shaft.

15. An occupant support comprising
a seat bottom,
a seat back coupled to the seat bottom for pivotable movement about a seat-back pivot axis relative to the seat bottom, and
a seat-motion controller configured to control pivotable movement of the seat back relative to the seat bottom, the seat-motion controller including a right recliner arranged along a right lateral side of the seat back, a left recliner arranged along a left lateral side of the seat back, and a dual-recliner actuator that interconnects the right recliner and the left recliner and provides means for changing the right and left recliners between a locked arrangement and an unlocked arrangement so that neither recliner blocks the other from reaching the locked arrangement as the right and left recliners move from the unlocked arrangement to the locked arrangement and means for providing a lost-motion driving connection between the dual-recliner actuator and both the right recliner-lock and the left recliner-lock to allow each recliner-lock to move between the locked arrangement and the unlocked arrangement independently of one another so that neither recliner-lock blocks the other recliner-lock from returning to the locked arrangement.

16. The occupant support of claim 15, wherein the right and left recliners each include a fixed flange coupled to the seat bottom, a mobile flange coupled to the seat back and configured to move relative to the fixed flange, and a recliner-lock configured to block pivotable movement of the seat back in the locked arrangement and allow pivotable movement of the seat back about the seat-back pivot axis in the unlocked arrangement.

17. The occupant support of claim 16, wherein the dual-recliner actuator includes a connector tube interconnecting the right and left recliners and arranged at a right locking shaft angular orientation, a right lost-motion insert coupled to the recliner-lock of the right recliner and arranged at a left locking shaft angular orientation, and a left lost-motion insert coupled to the recliner-lock of the left recliner and arranged at a third angular orientation.

18. The occupant support of claim 17, wherein the right lost-motion insert and the left lost-motion insert are movable relative to one another and relative to the connector tube.

19. The occupant support of claim 17, wherein each lost-motion insert includes a body, a plurality of splines, and a plurality of flex fingers, the body having an external surface that engages the connector tube and an internal surface defining a passageway that receives a corresponding shaft, the plurality of splines coupled to the internal surface in mating arrangement with corresponding splines on the shaft.

20. The occupant support of claim 19, wherein the plurality of flex fingers form a friction-interference fit with the shaft.

\* \* \* \* \*